United States Patent
Yashiro (10) Patent No.: US 8,923,553 B2
(45) Date of Patent: Dec. 30, 2014

(54) IMAGE PROCESSING APPARATUS, IMAGE PROCESSING METHOD, AND STORAGE MEDIUM

(75) Inventor: Satoshi Yashiro, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 566 days.

(21) Appl. No.: 13/185,388

(22) Filed: Jul. 18, 2011

(65) Prior Publication Data

US 2012/0020519 A1 Jan. 26, 2012

(30) Foreign Application Priority Data

Jul. 21, 2010 (JP) .................. 2010-164301

(51) Int. Cl.
*G06K 9/00* (2006.01)
*G06K 9/32* (2006.01)

(52) U.S. Cl.
CPC .......... *G06K 9/00369* (2013.01); *G06K 9/3241* (2013.01)
USPC ............ 382/103; 382/104; 382/173; 382/132

(58) Field of Classification Search
CPC .......................... G06K 9/3241; G06K 9/00369
USPC ................ 382/103, 104, 229, 254, 132, 107; 375/240.15, 240.16, 240.23, 240.27; 348/234, E09.053, 239, 207.99
See application file for complete search history.

(56) References Cited

U.S. PATENT DOCUMENTS

| | | | | |
|---|---|---|---|---|
| 5,896,176 A | * | 4/1999 | Das et al. | 375/240.15 |
| 7,352,917 B2 | * | 4/2008 | Kondo et al. | 382/291 |
| 8,134,613 B2 | * | 3/2012 | Kondo et al. | 348/239 |
| 8,204,316 B2 | * | 6/2012 | Panahpour Tehrani et al. | 382/224 |
| 2007/0268369 A1 | * | 11/2007 | Amano et al. | 348/207.99 |
| 2009/0110299 A1 | * | 4/2009 | Panahpour Tehrani et al. | 382/224 |
| 2012/0002081 A1 | * | 1/2012 | Chou et al. | 348/234 |

FOREIGN PATENT DOCUMENTS

| | | | |
|---|---|---|---|
| JP | 2004-213572 A | 7/2004 | |
| JP | 4171310 B2 | 10/2008 | |
| JP | 2008-299516 A | 12/2008 | |
| JP | 2009301495 A | * 12/2009 | ............... G06T 7/00 |

OTHER PUBLICATIONS

2001 IEEE Computer Society Conference on Computer Vision and Pattern Recognition "Rapid Object Detection using a Boosted Cascade of Simple Features", Paul Viola and Michael Jones.

* cited by examiner

*Primary Examiner* — Mekonen Bekele
(74) *Attorney, Agent, or Firm* — Canon U.S.A., Inc. IP Division

(57) ABSTRACT

An image processing apparatus includes a region setting unit configured to set a specific region where a reflection may occur in an image, a size setting unit configured to set a size of an object to be detected in association with a position in the image, and a changed region detection unit configured to detect a changed region by comparing a background model and an input image, wherein the changed region detection unit outputs the changed region in the specific region based on the size of the object associated with a position of the changed region, in a case where the changed region extends beyond a boundary of the specific region.

11 Claims, 7 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to image processing, and in particular to, for example, an apparatus and a method for detecting an entire or a part of a specific object such as a human, an animal, a vehicle, and a physical body in a moving image.

2. Description of the Related Art

Conventionally, the following techniques have been discussed as techniques for detecting an object in an image captured by a camera. First, there is a method for detecting a moving object by the background subtraction method. In the background subtraction method, an image without an object is captured by a fixedly installed camera and is registered as a background in advance. Then, a difference is calculated between an image input from the camera when an object is detected and the registered background, and a region with some difference is detected as a moving object. Further, improvement of this technique has been proposed.

For example, Japanese Patent Application Laid-Open No. 2004-213572 discusses the improvement in detection accuracy by hourly recording a background, and recording reflection by a mirror, a degree of glossiness, and a change of color information. As another example, Japanese Patent Application Laid-Open No. 2008-299516 discusses a technique for evaluating the possibility of swing of a shadow, and automatically setting a detection region so as to reduce false detection due to the shadow. This possibility of swing of a shadow is evaluated with use of, for example, an area ratio of a changed region obtained based on the background difference and a varying region obtained based on variation in luminance of pixels, and duration time when the changed region and the varying region overlap.

As still another example, Japanese Patent No. 4171310 discusses a technique for reducing false detection by determining whether a moving object detected in a detection region is an object to be ignored, and automatically correcting the detection region. More specifically, whether a moving object is an intruding object is determined based on duration time when a changed region outside a non-detection region is detected. Further, the detection region is automatically corrected based on this result.

On the other hand, one example of techniques for detecting an object such as a face or a human in an image is discussed in "Rapid Object Detection using a Boosted Cascade of Simple Features" written by Paul Viola and Michael Jones, presented at 2001 IEEE Computer Society Conference on Computer Vision and Pattern Recognition (hereinafter referred to as "non-patent document 1"). This technique scans a predetermined-sized detection window in an input image, and determines pattern images formed by clipping an image in the detection window into two classes, i.e., the object or not.

To facilitate the determination of the class, the technique provides a discriminator constructed by effectively combining a large number of weak discriminators using AdaBoost to improve the determination accuracy, and provides a cascade type detector constructed by connecting these discriminators in series. Further, each weak discriminator is configured to make a determination based on a Haar type rectangular feature amount, and rapidly calculate the rectangular feature amount using an integral image.

This cascade type detector first removes a pattern candidate that is obviously not an object on the spot, using a simple discriminator (handling a smaller calculation amount) on a previous stage. Only the remaining candidates are determined whether they are an object by a complex discriminator (handling a larger calculation amount) having a higher identification performance on a latter stage. In this way, this technique eliminates the necessity of making complex determinations for all of the candidates, thereby achieving high-speed processing.

However, if there is a reflective region where a window or a highly reflective wall exists in an input image, the conventional object detection techniques may cause false detection by being affected by a reflection, and therefore such a reflective region is handled as a non-detection region. Accordingly, an object passing in front of the reflective region cannot be detected, and a limitation is imposed on a location where a camera is installed.

SUMMARY OF THE INVENTION

The present invention is directed to a technique capable of reducing false detection due to a reflected image.

According to an aspect of the present invention, an image processing apparatus includes a region setting unit configured to set a specific region where a reflection may occur in an image, a size setting unit configured to set a size of an object to be detected in association with a position in the image, and a changed region detection unit configured to detect a changed region by comparing a background model and an input image, wherein the changed region detection unit outputs the changed region in the specific region based on the size of the object associated with a position of the changed region, in a case where the changed region extends beyond a boundary of the specific region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2:
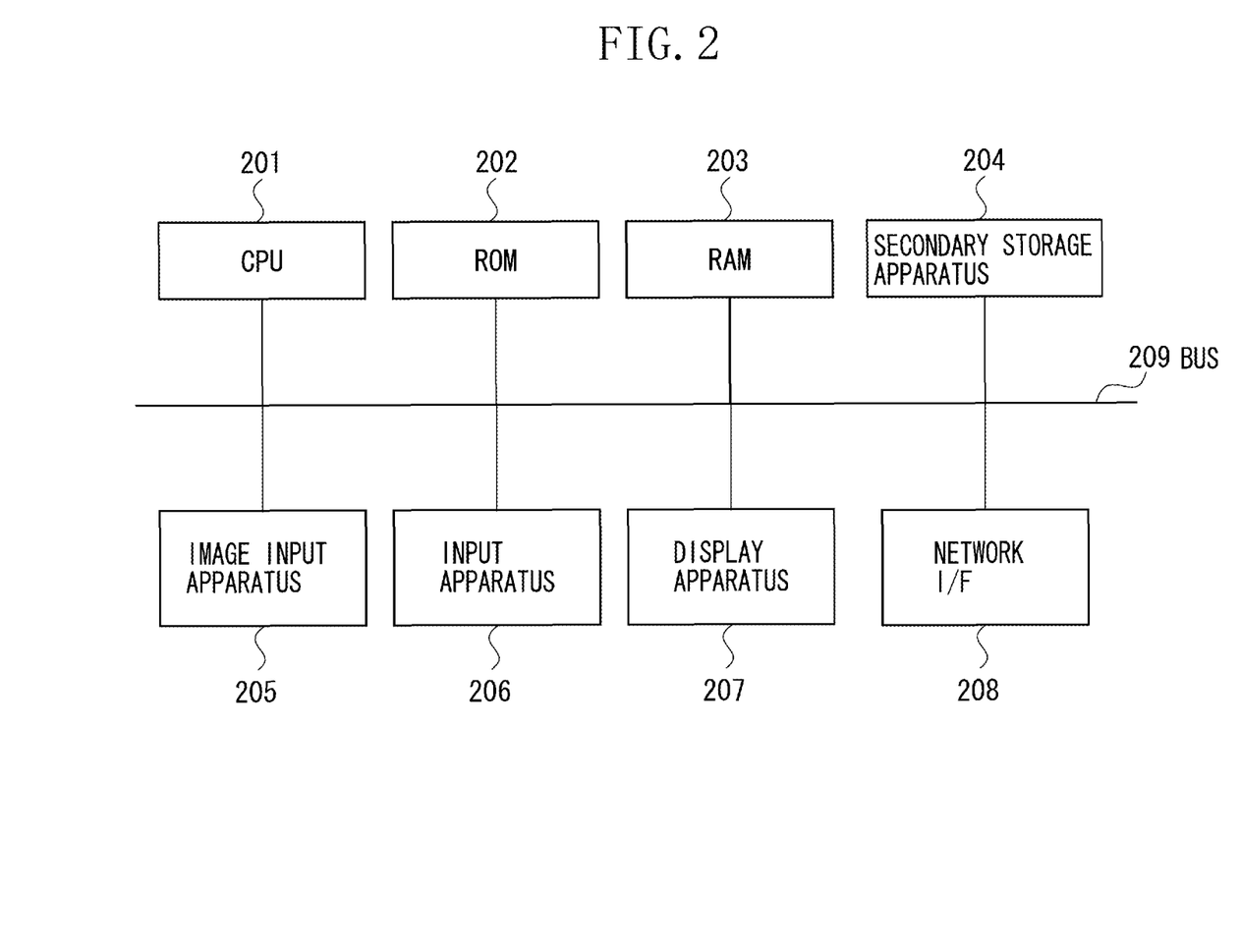
FIG. 2 is a block diagram illustrating an example of a hardware configuration of the image processing apparatus according to a first exemplary embodiment of the present invention.

FIG. 2 is a block diagram illustrating an example of a hardware configuration of an image processing apparatus according to a first exemplary embodiment. In FIG. 2, a central processing unit (CPU) 201 executes an instruction according to a program stored in a read only memory (ROM) 202 and a random access memory (RAM) 203. The ROM 202 is a nonvolatile memory, and stores a program of the present exemplary embodiment and programs and data required for the other control. The RAM 203 is a volatile memory, and stores temporary data such as a frame image and a pattern determination result.

A secondary storage apparatus 204 is a rewritable storage apparatus such as a hard disk drive or a flash memory, and stores, for example, image information, an image processing program, and contents of various settings. These pieces of information are transferred to the RAM 203, and then, the CPU 201 executes the program or uses the data. An image input apparatus 205 is an apparatus for inputting an image, such as a digital video camera, a network camera, or an infrared camera. An input apparatus 206 is an apparatus for inputting an instruction from an operator, such as a keyboard or a mouse.

A display apparatus 207 is, for example, a cathode-ray tube (CRT) display or a liquid crystal display. A network interface (I/F) 208 is, for example, a modem or a local area network (LAN) for establishing a connection to a network such as an internet or an intranet. The image processing apparatus may be connected to an image input apparatus such as a network camera via the network I/F 208, and an image may be input via the network. A bus 209 connects these components among one another, enabling an input and an output of data among them. The image processing apparatus according to the present exemplary embodiment is implemented as an application that operates on an operating system.

Figure 1:
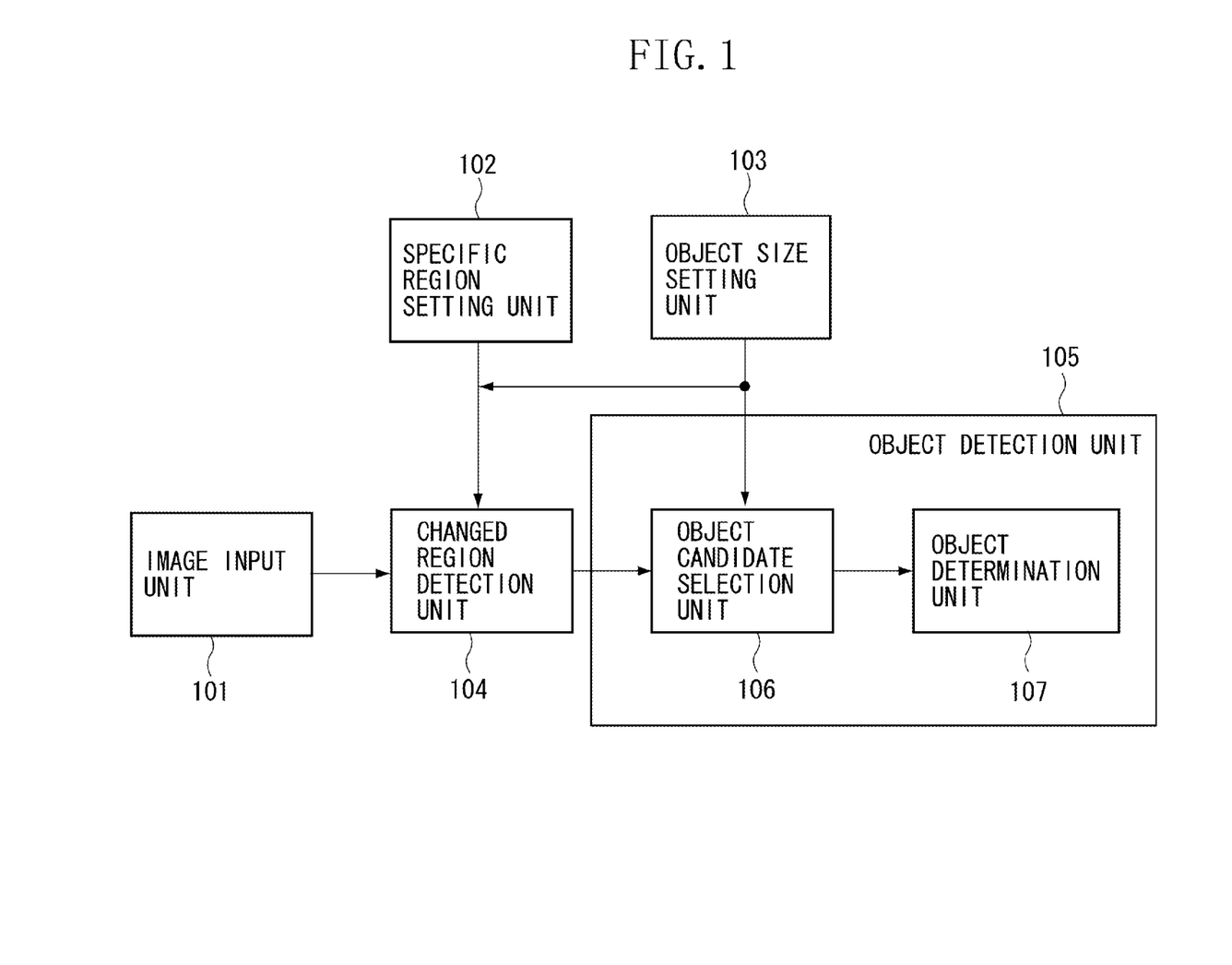
FIG. 1 is a block diagram illustrating an example of a functional configuration of an image processing apparatus.

FIG. 1 is a block diagram illustrating an example of a functional configuration of the image processing apparatus according to the present exemplary embodiment. In FIG. 1, an image input unit 101 is realized by utilizing the image input apparatus 205. A specific region setting unit 102 specifies a reflective region highly likely having a reflection of, for example, a window and a wall, in a region where an operator wants to detect an object. Further, a specific region is set via the input apparatus 206 according to an angle of view acquired by the image input unit 101.

An object size setting unit 103 sets a size of an object to be detected according to an angle of view acquired by the image input unit 101, based on an input via the input apparatus 206. A changed region detection unit 104 detects, as a changed region, a region different from a normal state in an image input by the image input unit 101. An object detection unit 105 detects a position of an object in an input image from the changed region detected by the changed region detection unit 104 under constraints set by the object size setting unit 103. The object detection unit 105 includes an object candidate selection unit 106 and an object determination unit 107.

In the following, a flow of processing according to the present exemplary embodiment will be described. The present exemplary embodiment will be described based on an example of the image processing apparatus which detects a human body such as a pedestrian as an example of an object by the image input apparatus 205 fixed to, for example, a ceiling or a utility pole. The image processing apparatus of the present exemplary embodiment can be applied to detection of not only a pedestrian but also various kinds of objects such as a person on, for example, a wheelchair, a baby stroller, and a bicycle, a person pushing a shopping cart or the like, an animal, a vehicle, and a physical body.

Figure 7:
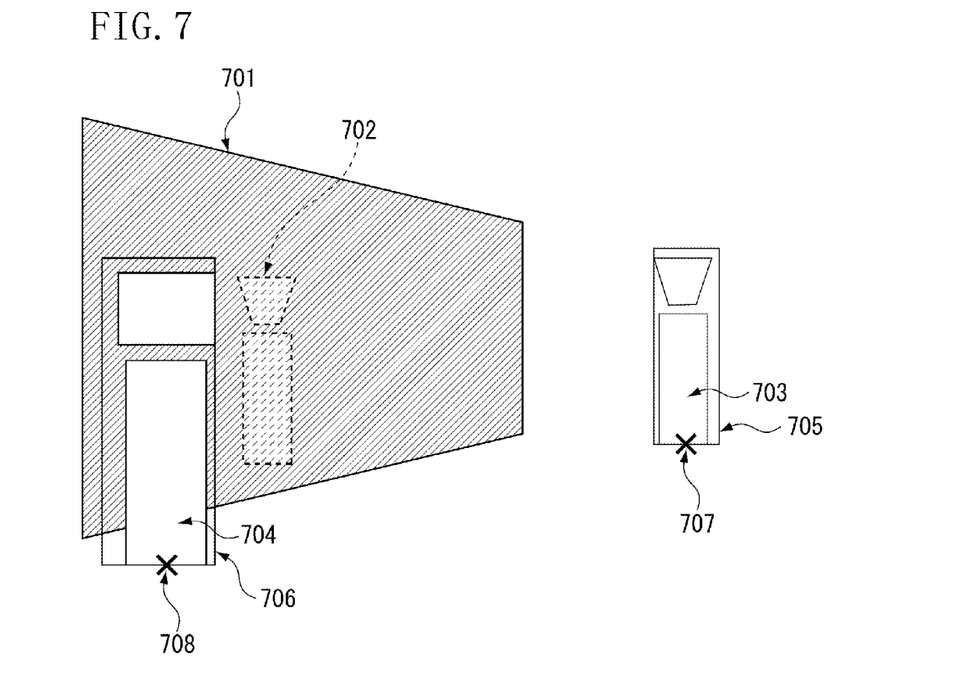
FIG. 7 illustrates an example of a camera image captured by a camera installed on a utility pole on a sidewalk.

FIG. 7 illustrates how a walking pedestrian is viewed, and illustrates an example of a camera image captured by a camera installed at a utility pole on a sidewalk. A graphic 701 represents a highly reflective wall such as a glass window or a metallic panel. Graphics 703 and 704 represent humans. Photographing a human from obliquely above in this way makes a human identification based on a face thereof easier. An image 702 is a virtual image of the human 703 which is generated from a reflection of the human 703 on the wall 701. It is assumed that a straight line in a real space is also shown as a straight line in this image, and a horizontal straight line in a real space is also shown as a horizontal line in FIG. 7. If the coordinate axis cannot be a straight line due to lens distortion or the like, camera calibration may be performed to correct geometric distortion.

The image processing apparatus according to the present exemplary embodiment mainly operates under two operation modes. One of the two operation modes is a setting mode which is performed after the camera is installed and an angle of view is determined. The other mode is a detection mode which is performed for detecting a moving object based on the settings established in the setting mode.

Figure 3:
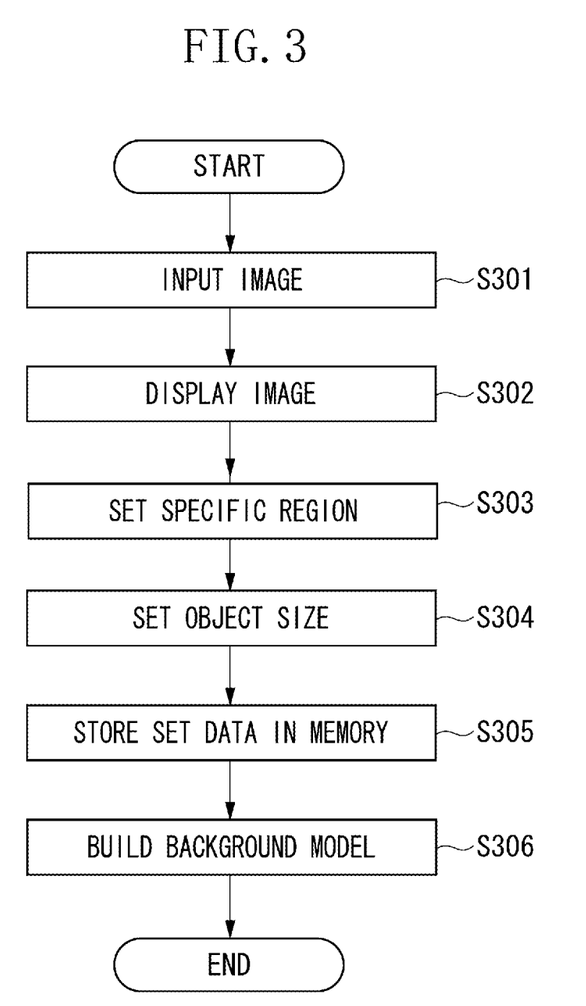
FIG. 3 is a flowchart illustrating an example of a processing procedure in a setting mode.

First, a flow of the setting mode will be described. FIG. 3 is a flowchart illustrating an example of a processing procedure in the setting mode.

First, in step S301, the image input unit 101 inputs a moving image. The resolution of a moving image in the present exemplary embodiment is compliant with Video Graphics Array (VGA), and thirty images are input per second. Next, in step S302, the input moving image is displayed on the display apparatus 207.

Next, in step S303, the specific region setting unit 102 sets a specific region. The specific region is set by specifying vertices of a polygon containing the specific region in the moving image displayed on the display apparatus 207 using the input apparatus 206. In the example illustrated in FIG. 7, the region containing the highly reflective wall 701 is set as the specific region. When a pedestrian is detected, a motion of feet of an object below a specific region. Therefore, the specific region is set after the imaging direction of the image input apparatus 205 is adjusted so that the feet of the object are contained in the screen.

Next, in step S304, the object size setting unit 103 sets a size of the object to be detected according to a position in the moving image. In the present exemplary embodiment, the image input apparatus photographs the human 703 and the human 704 located on two positions different distances away from the camera, and rectangles 705 and 706 of sizes of the object to be detected are input with reference to the sizes of the humans by the input apparatus 206. Then, these rectangles 705 and 706 are recorded so as to be associated with points 707 and 708 of the bottoms of the object sizes. In the image illustrated in FIG. 7, if the points 707 and 708 are positioned at a same height, the object sizes are the same, since the camera is horizontally installed. Further, an object size corresponding to a point positioned at another height can be acquired by the linear interpolation method.

Alternatively, another method for setting an object size is to set space information, which makes the setting processing simpler. The space information is an equation for alternately converting between a three-dimensional coordinate system representing a real space which is now being photographed and a coordinate system on an image of the input image. The parameters in the conversion equation can be estimated by performing camera calibration. Further, a size of each of objects to be main detection targets is stored in the ROM 202 in advance, and the object to be detected is selected from the input apparatus 206, so that the object size to be detected can be acquired according to a position in the moving image from the space information. The object size can be easily set in this way.

Next, in step S305, the vertices of the polygon set by the specific region setting unit 102 and the object sizes corresponding to the two points set by the object size setting unit 103 are stored in the secondary storage apparatus 204. If a relationship between the real space and the moving image is known in advance, it is possible to obtain an object size at a position in the moving image only by setting the object size.

Next, in step S306, a background model is built using an image without an object therein. More specifically, a frame image without an object therein is set as the background model. Alternatively, temporal variations may be modeled by storing images during a predetermined time, and calculating an average and dispersion for each pixel. Instead of pixel unit, the modeling may be performed by a region unit of a predetermined size, such as a block of an image divided into a grid pattern. Alternatively, the background model can be built by the improved technique discussed in, for example, the above-described Japanese Patent Application Laid-Open No. 2004-213572.

Figure 4:
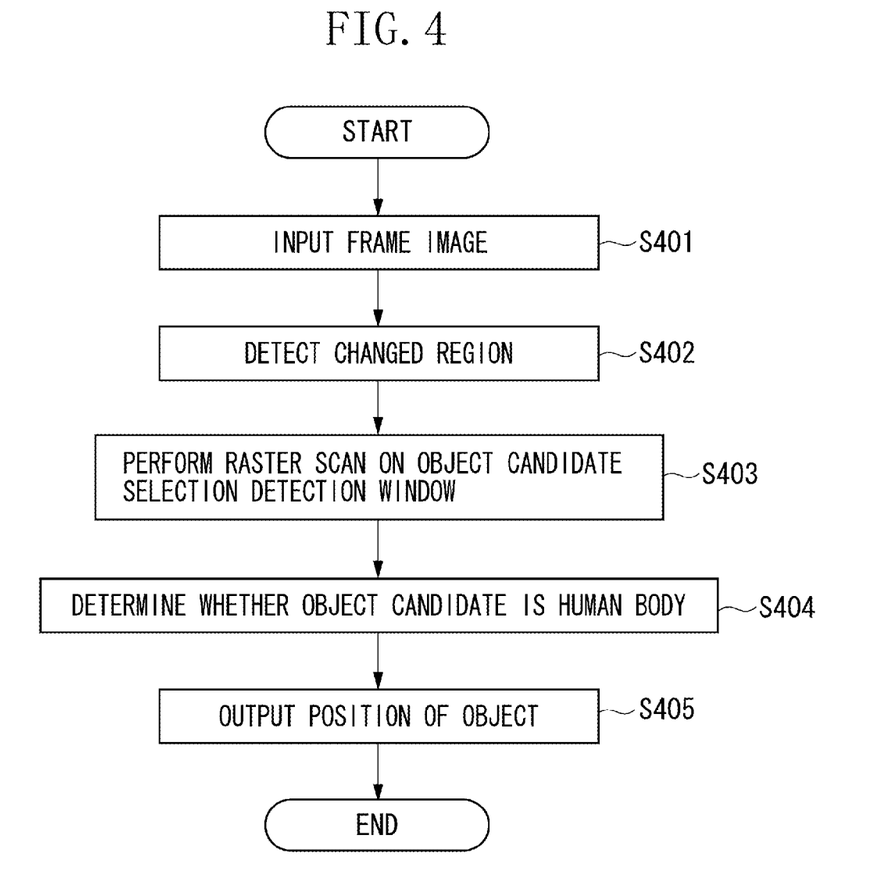
FIG. 4 is a flowchart illustrating an example of a processing procedure in a detection mode.

In the following, a flow of the detection mode will be described. FIG. 4 is a flowchart illustrating an example of a processing procedure in the detection mode.

First, in step S401, the image input unit 101 inputs one frame image. Next, in step S402, the changed region detection unit 104 detects a changed region from the frame image. As will be described in detail below, according to the processing in step S402, a region that may be the object is output as a changed region.

Figure 6:
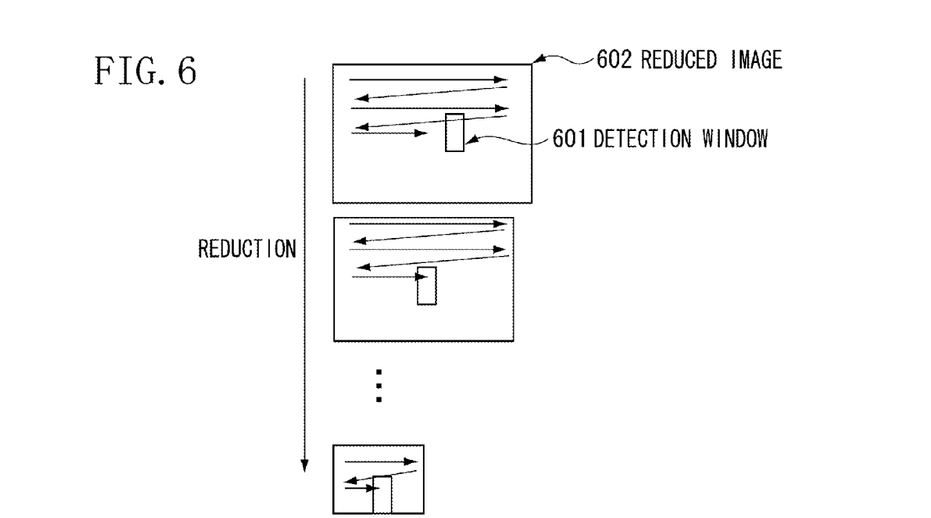
FIG. 6 illustrates a state in which an image is shrunk into a plurality of levels of resolution, and a detection window is scanned.

Next, in step S403, the object candidate selection unit 106 narrows down detection windows to which an object determination is performed. As illustrated in FIG. 6, the object candidate selection unit 106 reduces the input image into a plurality of levels of resolution, and scans a detection window 601 in a reduced image 602 at each resolution. The detection window 601 is a window having a fixed size. Therefore, an image reduced at a higher reduction ratio has a detected object of a larger size.

At this time, the object candidate selection unit 106 narrows down the candidates according to two criteria, one of which is whether the candidate is within the range of the size of the object to be detected, and the other is whether the region is the changed region. As a result, it is possible to reduce the number of times of object determinations while reducing false detection.

In the narrowing down processing according to the object size, the object candidate selection unit 106 excludes a detection window having a size out of the possible range from the relationship between the size of the object to be detected and the position based on the contents of the settings established in step S304. Further, in the narrowing down processing according to whether the region is the changed region, the object candidate selection unit 106 excludes a detection window if the ratio of a changed region in the detection window is equal to or smaller than a predetermined threshold value.

Alternatively, another possible method is to set a template having the same shape as the object into a detection window, and the detection window may be excluded if the ratio of the changed region in the template is equal to or smaller than a predetermined threshold value.

Next, in step S404, the object determination unit 107 determines whether the object candidate is a human body. Whether an image within the detection window is the object or not can be determined as discussed in the above-described non-patent document 1. Since a plurality of detection windows is determined as the object in the vicinity of the object, the detection windows indicating the same object are grouped. The position of the object can be ultimately determined by clustering the detection windows based on the central position and the size thereof, and averaging the positions of the respective clusters.

Next, in step S405, the positional information of the object is output to the display apparatus 207. The positional information of the object can be used for the following purposes. For example, the number of pedestrians can be counted by analyzing a movement track of the object, and a warning signal can be generated when an abnormal situation occurs by determining whether the track is different from a normal one.

Figure 5:
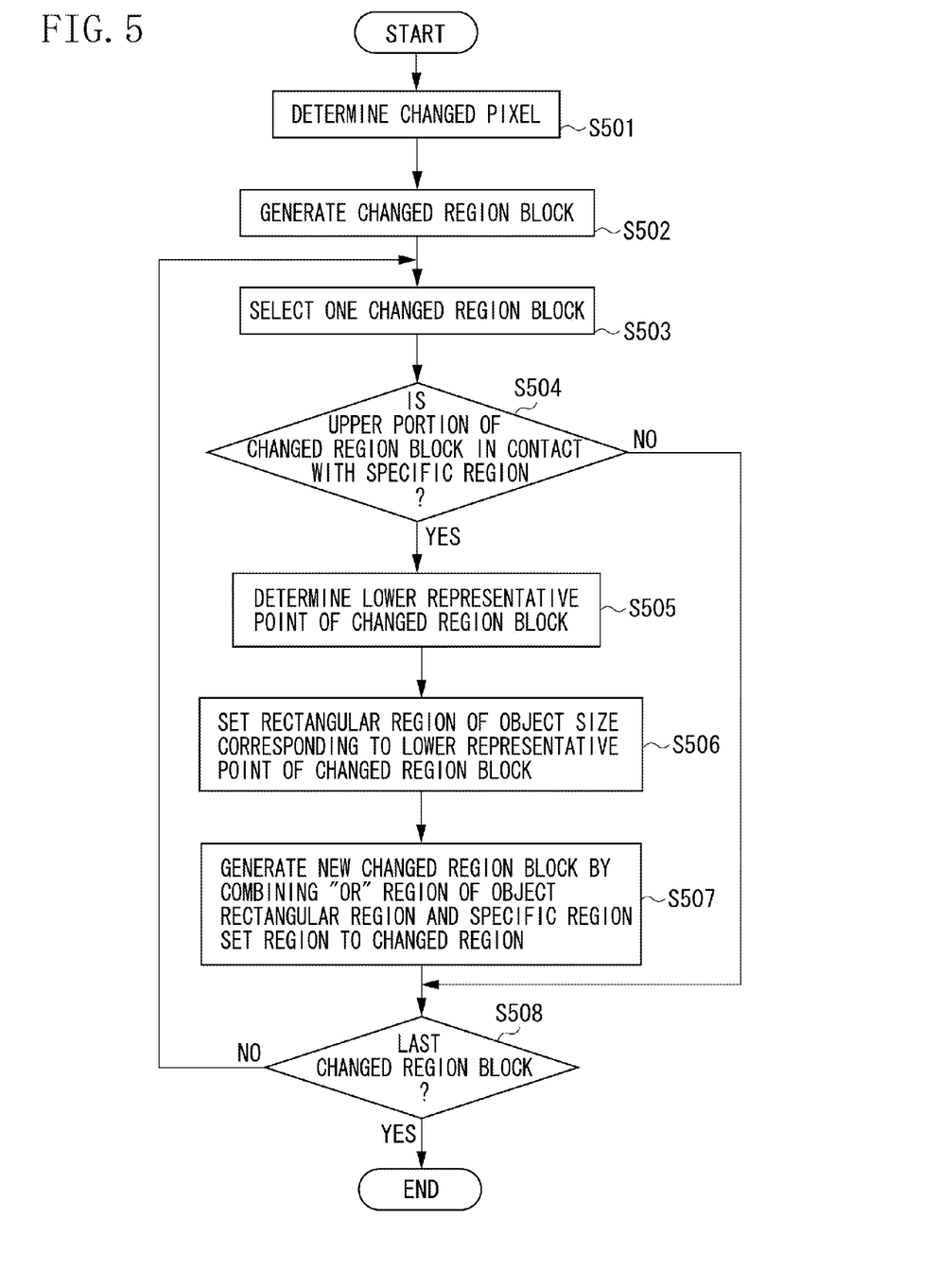
FIG. 5 is a flowchart illustrating an example of a detailed procedure of changed region detection processing.

In the following, the processing of the changed region detection unit 104, which corresponds to step S402, will be described in detail. FIG. 5 is a flowchart illustrating an example of a detailed procedure of the changed region detection processing.

First, in step S501, the changed region detection unit 104 compares each pixel in the input frame image with the corresponding pixel in the background model built in step S306, and determines whether the pixel shows the background. More specifically, the changed region detection unit 104 determines that the pixel does not show the background if a difference between each pixel value and the background model built in step S306 exceeds a predetermined range. Making determinations for all of the pixels results in generation of a binary image having the same size as the input image which indicates that the pixel is changed.

The determination may be made based on, for example, the unit of a block constituted by 8*8 pixels, instead of the unit of a pixel. Accordingly, the processing cost can be reduced, and a robust determination against, for example, noises can be performed by referring to a larger region than a pixel.

Next, in step S502, the changed region detection unit 104 combines a plurality of changed pixels adjacent to each other in the regions excluding the specific region in the binary image set in the previous step into one block, and thus generates a changed region block.

At this time, the specific region is excluded because not only the specific region may contain a reflection but also a wall and a window of a building have a low degree of flatness unlike a mirror, and therefore often cause reflected light to scatter, leading to a high possibility of false detection. Alternatively, in the specific region, determination, expansion, and reduction of the changed pixel may be processed by a parameter different from the parameter for the outside of the specific region. Further, the changed region block corresponding to a moving object can be generated by performing degeneration processing and expansion processing before generating the changed region block. The degeneration processing is effective in eliminating an isolated small pixel. Further, the expansion processing is effective in correcting a pixel determined as a background on the moving object.

Next, in steps S503 to S508, the changed region detection unit 104 performs the processing for all of the changed region blocks. More specifically, first, in step S503, the changed region detection unit 104 selects one changed region block to be focused. At this time, the changed region detection unit 104 separates the changed region block at the boundary of the specific region for preventing the changed region blocks from connecting through the specific region and generating a large changed region block, and selects the changed region block outside the specific region one by one.

Next, in step S504, the changed region detection unit 104 determines whether the changed region block extends beyond the lower boundary between the inside and the outside of the specific region. As a result of the determination, if the changed region block extends beyond the lower boundary (YES in step S504), the processing proceeds to step S505. If the changed region block does not extend beyond the lower boundary (NO in step S504), the processing proceeds to step S508.

Next, in step S505, the changed region detection unit 104 determines a representative point of the lower portion of the changed region block to acquire the object size corresponding to the changed region block. The representative point is an intersection point of a perpendicular line drawing from the center of gravity of the changed region block with the lower boundary of the block.

If the boundary between the changed region block and the specific region is not horizontal, an error occurs in the position of the center of gravity. In this case, the center of gravity can be determined by acquiring the center of gravity of the changed region block lower than a horizontal line passing through the lowermost point of the boundary between the changed region block and the specific region. Further, when there is a shadow of the object or a reflection generated by a floor surface, the representative point can be determined by performing the above-described processing after the changed region block is corrected by a shadow removal method and a floor surface reflection removal method which are not illustrated in the drawings.

Further, the changed region may split at the lower portion, for example, in a case where a human opens his/her legs. In this case, the representative point may be determined by replacing the changed region block with a smallest convex polygon containing the changed region block, and acquiring an intersection point of the perpendicular line drawing from the center of gravity thereof with the lower boundary of the block. Further, instead of the center of gravity of the changed region block, the representative point may be determined by using the center of gravity or the central point between the right and left ends of a circumscribed polygon of the changed region block or the smallest convex polygon containing the changed region block.

Next, in step S506, the changed region detection unit 104 sets a rectangular region of the object size corresponding to the representative point into the specific region. The object size is determined based on the position of the lower portion of the object and the setting of the object size set in step S305. At this time, the shape of the region is not limited to a rectangle, and may be any shape representing the object.

However, for an object that may have variations in the size and posture, like a human, it is preferable to set a region capable of covering these variations. Further, unchanged pixels may be removed from the set region to generate a limited region. Limiting the region in this way enables the object candidate selection unit 106 to more accurately select an object candidate in step S403.

Next, in step S507, the changed region detection unit 104 generates a new changed region block by combining (OR) the changed region in the region set in step S506 to the focused changed region selected in step S503. Then, the processing proceeds to step S508. If the current target changed region is the last changed region (YES in step S508), the processing is ended. If the current target changed region is not the last changed region (NO in step S508), the processing returns to step S503. Based on the changed region detected in the specific region by execution of the processing, a virtual image generated by a reflection and the object interfering with the specific region can be accurately distinguished.

Figure 8:
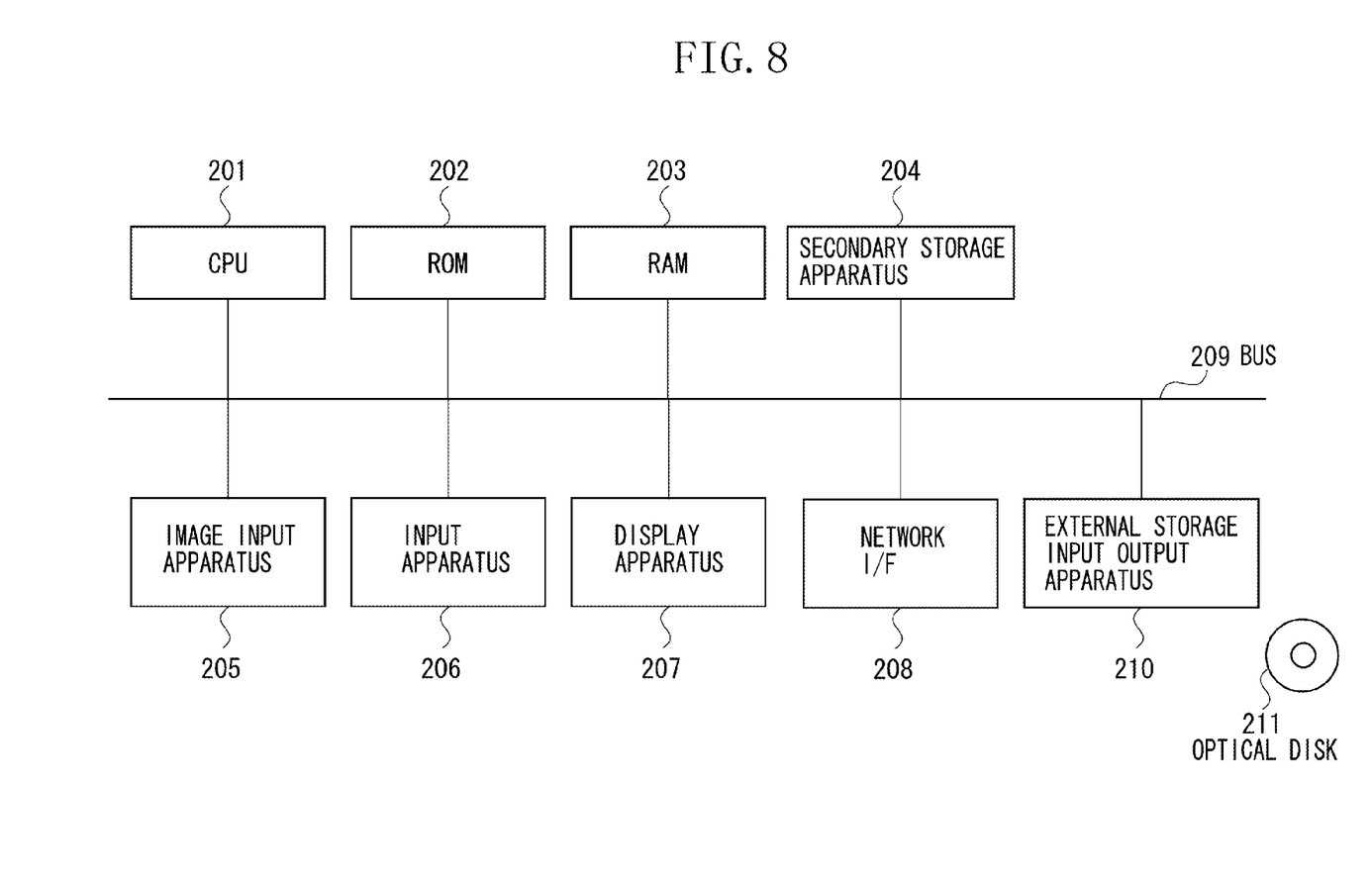
FIG. 8 is a block diagram illustrating an example of a hardware configuration of an image processing apparatus according to a second exemplary embodiment.

FIG. 8 is a block diagram illustrating an example of a hardware configuration of an image processing apparatus according to a second exemplary embodiment. Components in common with the first exemplary embodiment will be identified by the same reference numerals as those illustrated in FIG. 2. The block configuration additionally includes an optical disc 211 storing a program such as a digital versatile disc (DVD) or a compact disc (CD), and an external storage input output apparatus 210, which are differences from the first exemplary embodiment. According to the configuration of the second exemplary embodiment, upon insertion of the optical disc 211 into the external storage input output apparatus 210, the CPU 201 reads out the program from the optical disc 211, and develops it into the RAM 203, thereby realizing the processing similar to the first exemplary embodiment.

In the image processing apparatus illustrated in FIG. 2, the respective apparatuses are connected via the bus 209. However, some of the apparatuses may be connected via the network I/F 208. For example, the image processing apparatus may be configured in such a manner that an image input apparatus such as a network camera is connected via the network I/F 208 to input an image.

Further, the image input apparatus may be mounted on a camera platform so as to enable posture control such as panning and tilting. In this case, the present invention can be applied to a system that may involve a change in the orientation of the camera by generating a background model according to the posture of the camera or defining a coordinate system in which the angles of the camera in the horizontal and vertical directions are set to the coordinate axes to build a background model converted into a scale according to a zoom magnification.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-164301 filed Jul. 21, 2010, which is hereby incorporated by reference herein in its entirety.

What is claimed is:

1. An image processing apparatus comprising:
a region setting unit configured to set a specific region in an image in advance of detecting a changed region;
a size setting unit configured to set a size of an object to be detected in association with a position in the image;
a changed region detection unit configured to detect a changed region from an input image other than the specific region, by comparing a background model and the input image;
an object candidate region setting unit configured to set an object region in the specific region based on the size of the object associated with a position of the changed region, in a case where the changed region contacts with a boundary of the specific region; and
an extension unit configured to extend the changed region by combining the detected changed region with the object candidate region included in the specific region.

2. The image processing apparatus according to claim 1, further comprising an object detection unit configured to detect the object from the changed region based on the size of the object.

3. The image processing apparatus according to claim 2, wherein the object detection unit comprises,
an object candidate selection unit configured to select an object candidate from a region clipped from the input image, and
a determination unit configured to determine whether the object candidate is the object.

4. The image processing apparatus according to claim 3, wherein the object candidate selection unit selects the object candidate from the clipped region based on the size of the object.

5. The image processing apparatus according to claim 3, wherein the object candidate selection unit selects the object candidate based on a ratio of the changed region in the clipped region.

6. The image processing apparatus according to claim 1, wherein the changed region detection unit detects a changed pixel based on a difference between the background model and the input image, and combines a plurality of changed pixels adjacent to each other outside the specific region as a changed region block.

7. An image processing apparatus comprising:
a region setting unit configured to set a specific region where a reflection occurs in an image;
a size setting unit configured to set a size of an object to be detected in association with a position in the image; and
a changed region detection unit configured to detect a changed region by comparing a background model and an input image,
wherein the changed region detection unit outputs the changed region in the specific region based on the size of the object associated with a position of the changed region, in a case where the changed region extends beyond a boundary of the specific region,
wherein the changed region detection unit detects a changed pixel based on a difference between the background model and the input image, and combines a plurality of changed pixels adjacent to each other outside the specific region as a changed region block, and
wherein, in a case where the changed region block is in contact with the specific region, the changed region detection unit sets an object candidate region to the changed region block, and combines a region included in the object candidate region and the specific region, with the changed region block.

8. A method for processing an image, the method comprising:
setting a specific region in the image in advance of detecting a changed region;
setting a size of an object to be detected in association with a position in the image;
detecting a changed region from an input image other than the specific region, by comparing a background model and the input image;
setting an object region in the specific region based on the size of the object associated with a position of the changed region, in a case where the changed region contacts with a boundary of the specific region; and
extending the changed region by combining the detected changed region with the object candidate region included in the specific region.

9. A non-transitory storage medium storing a program that causes a computer to execute a method according to claim 8.

10. An image processing method comprising:
setting a specific region where a reflection occurs in an image;
setting a size of an object to be detected in association with a position in the image;
detecting a changed region by comparing a background model and an input image; and
outputting the changed region in the specific region based on the size of the object associated with a position of the changed region, in a case where the changed region extends beyond a boundary of the specific region,
wherein in detecting the changed region, a changed pixel is detected based on a difference between the background model and the input image, and a plurality of changed pixels adjacent to each other outside the specific region are combined into a changed region block, and
wherein, in a case where the changed region block is in contact with the specific region, setting an object candidate region to the changed region block, and combining a region included in the object candidate region and the specific region, with the changed region block.

11. A non-transitory storage medium storing a program that causes a computer to execute a method according to claim 10.

* * * * *